F. C. WAHLENMAIER.
APPARATUS FOR TESTING MUSCLES OF THE EYE.
APPLICATION FILED AUG. 4, 1913.
1,169,699.  Patented Jan. 25, 1916.
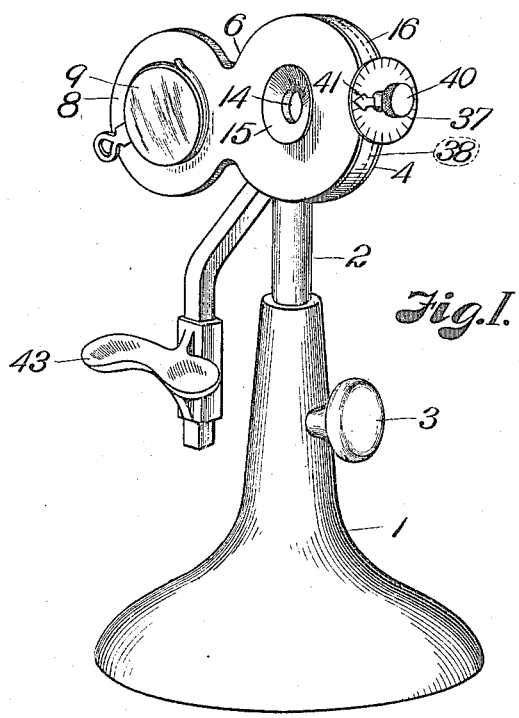
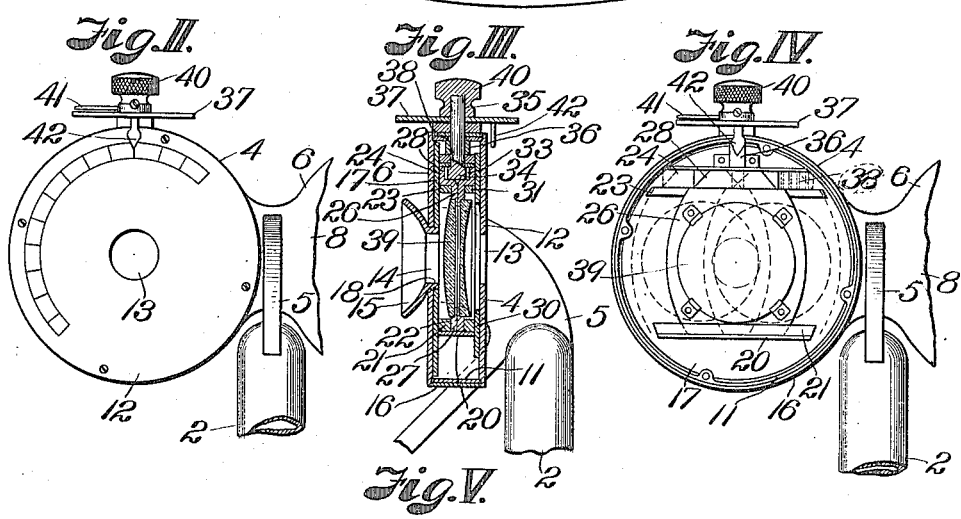
WITNESSES:  INVENTOR
Arthur W. Caps.  F. C. Wahlenmaier.
L. E. Coats.  BY
  Arthur C. Crow.
  ATTORNEY

UNITED STATES PATENT OFFICE.

FRANK C. WAHLENMAIER, OF KANSAS CITY, MISSOURI.

APPARATUS FOR TESTING MUSCLES OF THE EYE.

1,169,699.  Specification of Letters Patent.  Patented Jan. 25, 1916.

Application filed August 4, 1913. Serial No. 782,830.

*To all whom it may concern:*

Be it known that I, FRANK C. WAHLEN-MAIER, a citizen of the United States, residing at Kansas City, in the county of Jackson and State of Missouri, have invented certain new and useful Improvements in Apparatus for Testing Muscles of the Eye; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to optical instruments and more particularly to an instrument for measuring the strength or imbalance of and exercising the ocular muscles, the principal object of the invention being to provide a simple device for performing these functions otherwise than by the use of a complete set of prismatic lenses.

The invention is based on the well known principle that lenses of opposite refractive effect will neutralize each other when brought into proper relation, and that when such lenses are moved across each other, or so that their refractive bases are brought nearer together, a gradually increasing prismatic effect is produced, which, when properly measured will indicate the strength or imbalance of the ocular muscles.

In carrying out my invention I provide my device or instrument with a pair of lenses of opposite curvature, which are so arranged and mounted, that they may center in order to neutralize each other, but for lateral movement relative to each other in order to produce a prismatic effect and resultant bending of light rays, whereby a patient's eyes may be tested for measuring strength, detecting imbalance or exercising the ocular muscles.

In order that all of the muscles of the eye may be tested, I provide a preferred form of structure, which is illustrated in the accompanying drawings, wherein:—

Figure I is a perspective view of an instrument containing my improvements. Fig. II is a front view of the casing, forming a part of and containing other parts of the improved construction. Fig. III is a central, vertical section of the same. Fig. IV is a front elevation of the same with the cover plate removed. Fig. V illustrates the oppositely curved lenses, arranged concentrically or in neutral positions, and offset in opposite directions to produce prismatic effect.

Referring more in detail to the parts: 1 designates a base upon which the operative parts of the instrument are mounted and which is here shown to comprise a pedestal of ordinary construction, having a post 2 slidably mounted therein and adapted to be retained in adjusted position by a screw 3.

The operative mechanism of the instrument comprises a case 4, which is preferably mounted on the post 2 by means of a bracket arm 5, that may be affixed to the stationary front plate 6 that forms a part of the casing 4, although the detail of the mounting is immaterial. The plate 6 may have an extension 8 for carrying the ordinary testing lenses 9, although such extension does not form a part of the present invention.

The body of the plate 6 is preferably circular, and extending rearwardly therefrom is a circular band 11 carrying a back plate 12 at its rear edge, the back plate having an opening 13 and the front plate a concentric sight opening 14 which is provided with a cup 15 to which the eye of the patient may be placed, in order to properly center his vision through the sight opening and through the lenses which are carried within the apparatus. The ring 11 is inset from the edges of the front and back plates 6 and 12, and overlying said ring is a band 16 which is adapted to revolve on the ring 11, for a purpose presently set forth. Adjacent the rear face of plate 6 is a carrying plate 17 having an opening concentric with the openings 13 and 14, and into which the collar 18 of the cup 15 is projected so that no uneven surfaces are presented to the eye being tested with the device. Fixed to the inner face of the plate 17 at opposite sides of the opening are parallel tracks, one of which comprises an outwardly projecting member 20 having spaced ribs 21 thereon forming a trough 22 that faces in a plane parallel with that of the front and back plates of the inclosing casing, and the other comprising a pair of outwardly projecting members 23 forming a trough 24 that faces in a plane perpendicular to said plates and to that of the first named trough.

26 designates the lens frames, the edge of one of which has an end portion 27 projected into and adapted for sliding travel within the trough that is parallel to the casing, the other end of each of said frames having an offset head 28, the head on the front mounting being projected into the trough 24 so that it may slide therein. The head on the rear mounting lies in substantially the same plane as the outer edge of the outer member 23 and is held in place by a plate 30 which is supported on and secured to opposed track members, said plate having an inwardly directed rib 31 adapted to rise back of the offset portion of the head on the outer lens mounting, to assist in retaining said mountings in alinement. The inner face of each of the heads 23 is provided with rack teeth 33 which mesh with a pinion 34 that is carried by a pin 35 that is revolubly mounted in the band 16, the track member 23 on the plate 17, a collar 36 which is fixed on said track member, and in a disk 37 which is carried by, but spaced from said band; the end of the collar being adapted to slide over the inner face of the ring and the pin being projected through a circumferential slot 38 in said ring so that the pin may slide in the ring when the band is revolved thereabout, while tests are being made.

From the foregoing description it is apparent that the plate 17 is adapted for revolution with the band 16 by virtue of the pin 35 and its mounting in the several members.

The mountings 26 are adapted for carrying test lenses 39 which, in order to carry out the invention, are made of different refractive effect, those illustrated in the drawings being plano-convex and plano-concave, although cylindrical lenses or any other type which are adapted to neutralize each other when centered and produce a prismatic effect when offset, may be used.

In order that the operator may determine the prismatic angle for various positions of the lenses, I provide the pin 35 with a knob 40 and pointer 41, and the disk 37 with a scale adapted for coöperation with the pointer to indicate such angle so that when the lenses coöperate and the images produced in both eyes merge the prismatic angle is indicated on the scale.

Having provided for rotating the lenses, in order to secure tests at different angles, I also provide a scale for indicating the angle at which a certain test is made, this scale being preferably marked on the back plate 12 and read in connection with a pointer 42 on the disk 37, whereby the angle may be determined for any position of the disk and consequently of the test lenses. I also provide the instrument with a chin rest 43 which may be mounted in any suitable manner so that a patient may rest his chin thereon in such position that the eye will center with the sight cup 15.

Presuming the parts to be constructed and assembled as described, when a test is to be made the patient rests his chin on the support 43 with his eye in front of the cup 15 so that he may look through the eye-piece and test lenses to the ordinary chart, the test lenses being arranged concentrically in the first instance so that their curvatures neutralize each other and produce the effect of a plain glass. In making the test to determine the strength or imbalance of the muscles of the eye, the lenses are moved laterally relative to each other by manipulation of the rack and pinion mechanism so that the base or center of the convex lens and a base or edge of the concave lens are brought toward each other, thereby producing prismatic effect by which rays of light are caused to diverge in the meridian affected, as they approach the patient's eye, and in that manner determine the strength or imbalance of the ocular muscles, the positions of the lenses relative to each other, as indicated by the scale on the disk 41, being noted, in order to prescribe a curvature of lenses for eye-glasses or spectacles. If a test has been made with the lenses in a determined position the lenses are rotated from that position and new tests made, the angle of the rays of light with the lenses in a new position being noted in the manner described; the radial angle of the lenses, as indicated by the scale on the back plate, being also noted, and the tests being repeated for different positions, in order that all of the indications may be combined in order to prescribe a proper spectacle or eye-glass lens.

To use the instrument for exercising the ocular muscles the eye may be placed to the cup as for an ordinary prescription test, and the lenses moved back and forth across each other in order to vary the prismatic effect so that the muscles will expand and contract accordingly and sluggish muscles be thereby induced to resume their proper functions.

Having thus described my invention, what I claim as new therein and desire to secure by Letters-Patent, is:—

1. An instrument of the character described, comprising lenses of opposite refractive effect, and means for moving each of said lenses laterally relative to the other and means for rotating both of the lenses simultaneously.

2. An instrument of the character described, comprising lenses of opposite refractive effect, adapted for simultaneous lateral movement relative to each other to vary their combined prismatic effect, and means for revolving said lenses together independently of said variable movement.

3. In an instrument of the character described, a casing, parallel track members in said casing, plano-spherical lenses slidably mounted in said track members, and means for sliding said lenses in said track members and revolving said track members in said casing, for the purpose set forth.

4. In an instrument of the character described, a casing, parallel track members in said casing, lens holders slidably mounted in said track members, plano-spherical lenses in said holders, and actuating mechanism for moving said lens holders transversely, and having operative connection with said track members for revolving the tracks, the lens holders and said lenses in said casing.

5. In an instrument of the character described, a casing having a circumferential slot, an eye piece on one side of said casing, an apertured cover for the other side of said casing, a plate revolubly mounted in said casing, parallel tracks on said plate, a guide plate adjacent one of said tracks, a shaft revolubly mounted in said guide plate and projecting through said circumferential slot, a gear wheel rigidly mounted on said shaft and projecting beyond said guide plate, a pair of lens mountings slidably mounted on said tracks, offset, facing rack portions on said lens mountings adapted to mesh with said gear wheel, and lenses for said lens mountings, substantially as set forth.

6. In an instrument of the character described, a casing having a circumferential slot, an eye piece on one side of said casing, an apertured cover on the other side of said casing, a ring revolubly mounted on the outer periphery of said casing, a plate revolubly mounted on the interior of said casing, parallel track members on said plate, a guide rail on said plate adjacent one of said tracks, a shaft revolubly mounted in said guide rail and said ring and projecting through said circumferential slot, a dial surrounding said shaft and rigidly mounted on said ring, a pointer on said shaft adapted for coöperation with said dial, a gear wheel on said shaft adjacent said guide rail, a pair of lens mountings slidably mounted on said tracks, offset rack portions on said mountings adapted to mesh with said gear wheel, lenses secured in said mountings and an apertured retaining plate secured to said track members, for holding said mountings in position.

7. In an instrument of the character described, a pair of plano-spherical lenses of opposite curvature having a common optical center, and means for destroying the optical center of the pair and producing a prismatic effect.

In testimony whereof I affix my signature in presence of two witnesses.

FRANK C. WAHLENMAIER.

Witnesses:
R. F. THOMAS,
L. E. COATS.

Copies of this patent may be obtained for five cents each, by addressing the "Commissioner of Patents, Washington, D. C."